United States Patent
Harrenstien et al.

(10) Patent No.: US 7,085,553 B1
(45) Date of Patent: Aug. 1, 2006

(54) DATA COMMUNICATION PROTOCOLS FOR A MOBILE-BASED CLIENT-SERVER SYSTEM OVER A WIRELESS NETWORK

(75) Inventors: Kenneth Harrenstien, Palo Alto, CA (US); Kamal Ahluwalia, Union City, CA (US); David Kucharczyk, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 08/891,301

(22) Filed: Jul. 10, 1997

Related U.S. Application Data

(63) Continuation-in-part of application No. 08/521,660, filed on Aug. 31, 1995, now Pat. No. 5,850,517.

(51) Int. Cl.
*H04Q 7/20* (2006.01)
*H04M 11/00* (2006.01)

(52) U.S. Cl. ............................... 455/412.2; 455/412.1; 455/556.1; 455/556.2; 702/219

(58) Field of Classification Search ................ 455/556, 455/557, 403, 450, 452, 466, 422, 94.1, 38.4, 455/56.1, 38.1, 94.2, 220, 228, 412.2, 412.1, 455/413, 414–417, 458, 492.2, 490, 422.1, 455/556.1–556.2, 566–567; 375/93.24, 93.25, 375/88, 88.11, 88.12, 88.13, 88.14, 88.15; 370/401, 428–429, 463, 253, 397, 468, 384, 370/312, 93.24–93.29; 709/200.32–200.36, 709/200.01–200.15, 200.39, 206, 216–219; 340/825.44
See application file for complete search history.

(56) References Cited

U.S. PATENT DOCUMENTS 4,803,487 A * 2/1989 Willard et al. ............. 340/7.54
5,351,235 A * 9/1994 Lahtinen .................... 370/58.1

(Continued)

FOREIGN PATENT DOCUMENTS

EP     746131 A1 * 12/1996

(Continued)

*Primary Examiner*—Pablo N. Tran
(74) *Attorney, Agent, or Firm*—Bingham McCutchen LLP

(57) ABSTRACT

Intelligent paging services provided by a GSM-based mobile communication network are employed in a mobile-based client-server system to provide automatic notification of a mobile client station of the type and quantity of information awaiting delivery to a mobile client station at a centralized server, so that the client station may then establish a communication link to receive the information, without otherwise requiring a costly polling scheme. In a preferred embodiment, the server evaluates received or otherwise generated information that is intended for a respective client station to determine whether the information is of a selected type and/or quantity requiring notification of the client station. If so, the server transmits a message (e.g., alphanumeric) from a transceiver associated with the server to a transceiver associated with the client station, the message indicating the type and quantity of information awaiting delivery to the client station. The respective client station evaluates the received message and, if the specified information type and quantity justify the time and expense, establishes a log-on connection with the server via the respective client station and server transceivers in order to receive the information and, if expedient, conduct further information exchanges.

50 Claims, 3 Drawing Sheets

U.S. PATENT DOCUMENTS

| | | | |
|---|---|---|---|
| 5,392,452 A * | 2/1995 | Davis | 455/38.1 |
| 5,448,759 A * | 9/1995 | Krebs et al. | 455/517 |
| 5,463,623 A * | 10/1995 | Grimes et al. | 370/79 |
| 5,581,704 A * | 12/1996 | Barbara et al. | 395/200.09 |
| 5,628,055 A * | 5/1997 | Stein | 455/575.1 |
| 5,635,918 A * | 6/1997 | Tett | 340/825.52 |
| 5,717,737 A * | 2/1998 | Doviak et al. | 379/58 |
| 5,742,668 A * | 4/1998 | Pepe et al. | 379/58 |
| 5,745,695 A * | 4/1998 | Gilchrist et al. | 395/200.57 |
| 5,796,727 A * | 8/1998 | Harrison et al. | 370/338 |
| 5,835,724 A * | 11/1998 | Smith | 395/200.57 |
| 5,842,216 A * | 11/1998 | Anderson et al. | 707/203 |
| 5,845,202 A * | 12/1998 | Davis | 455/412 |
| 5,845,211 A * | 12/1998 | Roach, Jr. | 455/436 |
| 5,848,362 A * | 12/1998 | Yamashita | 455/567 |
| 5,850,517 A * | 12/1998 | Verkler et al. | 395/200.32 |
| 5,850,519 A * | 12/1998 | Vazana | 395/200.36 |
| 5,850,594 A * | 12/1998 | Cannon et al. | 455/31.3 |
| 5,852,775 A * | 12/1998 | Hidary | 455/404 |
| 5,884,159 A * | 3/1999 | Thro et al. | 455/412 |
| 5,958,006 A * | 9/1999 | Eggleston et al. | 709/219 |
| 5,960,367 A * | 9/1999 | Kita | 455/567 |
| 6,067,561 A * | 5/2000 | Dillon | 709/206 |
| 6,119,167 A * | 9/2000 | Boyle et al. | 709/234 |
| 6,237,040 B1 * | 5/2001 | Tada | 709/246 |
| 6,421,717 B1 * | 7/2002 | Kloba et al. | 709/219 |

FOREIGN PATENT DOCUMENTS

WO      WO 9114332 A1 * 9/1991

* cited by examiner

DATA COMMUNICATION PROTOCOLS FOR A MOBILE-BASED CLIENT-SERVER SYSTEM OVER A WIRELESS NETWORK

CROSS-REFERENCE TO RELATED APPLICATIONS

The present application is a continuation-in-part of U.S. application Ser. No. 08/521,660, entitled COMMUNICATION LINK FOR CENT-SERVER HAVING AGENT WHICH SENDS PLURALITY OF REQUESTS INDEPENDENT OF CLIENT AND RECEIVES INFORMATION FROM THE SERVER INDEPENDENT OF THE SERVER, filed on Aug. 31, 1995, now U.S. Pat. No. 5,850,517, the disclosure of which is hereby incorporated by reference in its entirety for all purposes as if fully set forth herein.

FIELD OF INVENTION

The present invention pertains to mobile-based client-server systems, including methods and protocols for establishing and maintaining data communications between a server and a mobile-based client station over a wireless network.

BACKGROUND

In conventional client-server systems, respective "client stations" (e.g., computer terminals having one or more client applications) must periodically obtain information from a server (e.g., a centralized computer system operating in conjunction with one or more databases). In this relationship, the server may be passive—i.e., where the server is configured to respond to specific requests from respective client stations but does not otherwise initiate communication—or active, i.e., where the server is configured to periodically transmit information to one or more client stations, regardless of whether a specific request has been made. An active server configuration may be especially useful in situations where the server receives updated information from an outside source that is important for a client station to receive immediately, e.g., changes in product pricing, inventory amounts, sales orders, reservations, stock prices, etc.

Client-server systems have conventionally been restricted to high speed, hard-wired networks—e.g., coaxial, twisted pair, optical fiber. More recently, however, client-server systems have also incorporated "mobile" client stations that are not hard-wired to a high speed network, e.g., such as portable (i.e., laptop) computers equipped with modems for connecting to the server via a dial-up, circuit-switched connection. "Wireless" modems and networks may also be employed to provide remote connectivity of client stations to a server over a wireless communication network, thereby allowing far greater mobility on the part of the client station.

In particular, as used herein, a "mobile-based" client-server system refers to a system having a server configured to periodically communicate with one or more mobile-based client stations over a wireless communication network. It should be noted that the term "mobile-based" does not necessarily preclude the existence of one or more client stations with hard-wired connections to the server as part of the same system, but only requires that the system support at least one mobile-based client station, as well.

An exemplary architecture for a mobile-based client-server system is set forth in commonly assigned U.S. patent application Ser. No. 08/521,660, filed Aug. 31, 1995, entitled "A Mobile-Based Client-Server System," which is assigned to the assignee of the present invention and which is fully incorporated herein by reference. As described therein, an "agent" is used in conjunction with a mobile-based client-server system, wherein the agent is coupled to the respective client stations through a wireless communication link. When a client station requests information from the server, the agent receives the request and handles the interaction with the server on behalf of, and independent of, the client station. Once the requested information is received by the agent, it can be transferred to the requesting client station in a manner which efficiently utilizes over-the-air ("OTA") bandwidth of the wireless communication link, independent of the server, i.e., such that the client station and the agent operate synchronously.

More particularly, in order to request and receive information from the server, a mobile-based client station must first establish a wireless communication link with the server (i.e., via the agent). After making the request, the client station must then maintain the communication link until such time as the server is able to gather and successfully transmit the requested information back to the client station. In situations where the server must itself obtain some or all of the information from a still further remote entity, this "download" process can take considerable time and, in view of the relatively high cost of maintaining a wireless communication link, expense.

This situation is especially problematic in an "active" client-server system, since the server can only transmit information to a respective client station when a communication link is established. Thus, to ensure it receives all pertinent information from the server as early as possible, a mobile-based client station would have to maintain a constant communication link with the server, which can be cost prohibitive—i.e., especially considering the potentially significant amount of "wasted" time spent while the client station is merely standing by, waiting to receive information from server. Alternatively, the client station may miss receiving updated information from the server, until such time as a communication link is eventually established for some other purpose.

In the alternative, a "polling" scheme may be employed by the client stations to determine whether there is any data on the server that is to be accessed. Essentially, this scheme requires a respective client station to periodically establish a communication link with the server to check for any waiting data or messages. If there are messages or data waiting to be downloaded, then the client will retrieve the information at that time. If there are no messages or data waiting, then the client will merely disconnect the communication link (i.e., "log off").

Even with a polling scheme, however, a notable amount of time and resources are consumed each time a remote connection is established from the client station to the server, whether or not there is any data waiting to be downloaded. In particular, each time an OTA connection is made, time and resources are consumed to set up and tear down the communication link. In other words, the client station must incur a fair amount of connection time and expense each time it checks the server for waiting data. Further, as the polling rate increases, the lost connection time and expense also increases.

Thus, it is would be desirable to provide methods and protocols for establishing and maintaining data communications between a server and a mobile-based client station over a wireless communication network, wherein a client station is automatically notified whenever information is waiting for it at the server, so that the client station may only then need to establish a communication link with the server in order to receive the information. In this manner, a mobile-based client station can receive information from a server on a nearly real-time basis, without having to maintain a constant wireless communication link, or employ a still costly polling scheme.

SUMMARY OF THE INVENTION

The present invention provides a mobile-based client-server system that allows for the efficient transfer of information from a server to a mobile client station via a wireless network.

In a preferred embodiment, a client station in a mobile-based client-server system is adapted for communication with a respective GSM-based wireless communication transceiver ("client station transceiver"), e.g., by a communication port configured for connecting to a GSM-based wireless telephone set. A centralized server that periodically receives or otherwise generates information to be delivered to the client station is connected, via a GSM-based wireless communication network, to an associated transceiver (i.e., "server transceiver"). Upon receiving or generating a selected threshold of information to be delivered to the client station, the server generates a signal containing a telephonic address of the client station and a message (e.g., alpha, numeric, binary, or some combination thereof) indicating that the server has information waiting for the client station. The server relays the signal to the GSM transceiver, which then transmits the message to the client station transceiver in the form of a wireless communication page, based on the telephonic address.

In particular, by way of a presently preferred example, the server transceiver employs a GSM-based short message service ("SMS"), which allows users to send and receive point-to-point alphanumeric messages up to a certain byte limit.

If the client station is connected to its transceiver, the message from the server is immediately received by the client station, which is thereby notified of the waiting information. In particular, the message will preferably (at least) identify both the type and quantity of information waiting at the server for the respective client station. If the information type and/or quantity meet selected thresholds of the client station, it then establishes a wireless OTA connection to server (i.e., via the respective client station and server transceivers), and the waiting information is then transferred from the server to the client station.

If the client station is not connected to its transceiver, receipt of the message from the server is preferably detected by a user of the client station (i.e., by an audible ring or mechanical vibration), who can then connect the transceiver to the client station so that it may receive and analyze the message. Alternately, the message may be viewed by the user on a display screen provided with the transceiver, wherein the user can then decide whether to establish a communication link between the client station and the server.

In either event, once a communication link is established, other information may also be exchanged between the server and client station—i.e., which was not otherwise a high enough priority to justify the cost of making and maintaining a wireless connection.

In accordance with a general aspect of the invention, full advantage may be taken of the intelligent paging services built into GMS-based SMS paging service. Thus, the server can be configured to provide extensive information about the type, quantity, and importance of the information waiting at the server. Intelligent filtering options can be employed at the server, client station, or both. By way of example, a filter can be set to activate the SMS paging notification of a client station only if certain types or quantities of information are waiting at the server. Likewise, a filter can be set at a respective client station so that a responsive wireless communication link is only established if selected information type or quantity thresholds are waiting at the server.

In alternate preferred embodiments, the paging activities may be controlled by the server itself, or by a specific application on the server.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 1:
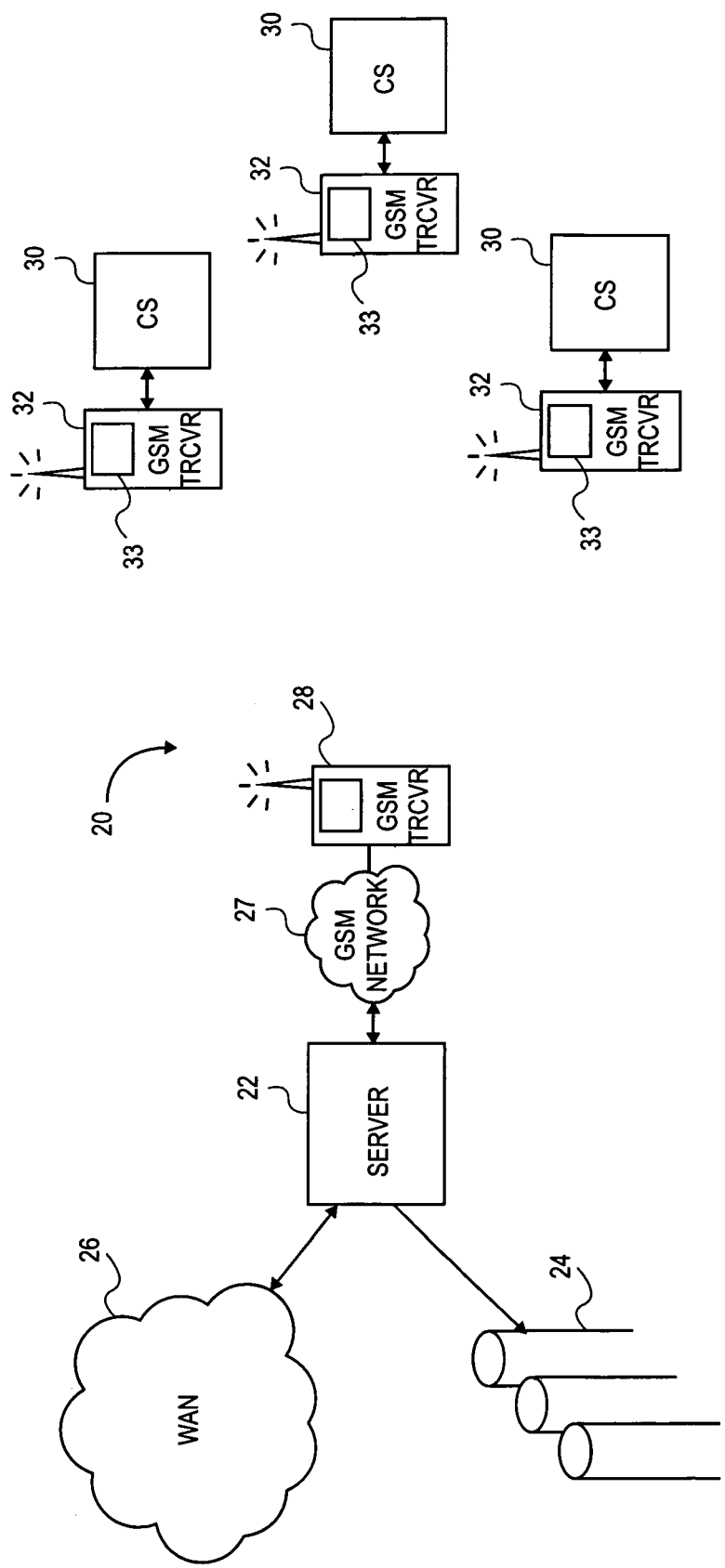
FIG. 1 is a simplified block diagram of an exemplary mobile-based client-server system, including a centralized server and a plurality of mobile-based client stations.

Referring to FIG. 1, an exemplary mobile-based client-server system 20 includes a server 22 that operates in conjunction with at least one and preferably a plurality of data bases 24. The server 22 may also be linked to multiple further servers (not shown) and data sources (also not shown) via a local or wide area network ("LAN" or "WAN") 26. In this manner, the server 22 (as well as any application programs residing thereon) may access any number of applications and stored information available through the network 26. The server 22 is connected to an associated communication transceiver 28 via a GSM-based wireless network 27 for communicating with a plurality of mobile client stations 30, which may comprise, e.g., suitable data terminals, laptop computers, or PDAs, etc.

As will be appreciated by those skilled in the art, the particular communication transceiver 28 associated with the server 22 may be any one of many transceivers available via the communication network 27, e.g., on a reserved, or dial-up basis. For purposes of ease in illustration, however, a single "server transceiver" 28 will be referred to in conjunction with the remaining detailed description.

Each mobile client station 30 is preferably connected to its own respective GSM-based wireless network transceiver 32, wherein a communication link between the server 22 and the respective client station 30 may be established via the respective server and client station transceivers 28 and 32. A particular advantage of employing GSM (i.e., "Global System for Mobile Communications") based transceivers 28 and 32 is that no additional modem is required at the server and client stations 22 and 30. Instead, data can be transmitted and received directly through the respective GSM-based transceivers 28 and 32—e.g., which may each consist of a respective mobile telephone set configured with a data communication port.

Generally, the client stations 30, including one or more residing application programs, periodically receive and transmit information from and to the server 22. In the case where information is to be sent from a client station 30 to the server 22 (e.g., a data retrieval request), the client station causes a wireless communication link to be established between the client station GSM transceiver 32 and the server GSM transceiver 28—i.e., via an agent also residing on the respective client station 30—and then transmits the respective information to the server 22. In certain cases, the client station may maintain the wireless communication link until responsive information is received back from the server 22. Otherwise, or at such time as the given information exchange is completed, the communication link is terminated.

In situations where the server 22 generates or otherwise receives information intended for a client station 30, the server 22 generates a signal containing a telephonic address of the client station 30 and a message indicating that the server 22 has information waiting for the client station 30, and relays this message to its associated GSM transceiver 28. The server transceiver 28 then transmits the message to the respective client station transceiver 32 via a wireless communication page based on the telephonic address.

In particular, the server transceiver 28 preferably employs a GSM-based short message service ("SMS") to send the message page to the client station transceiver 32, which allows users to send and receive point-to-point messages containing up to a few tens of bytes limit. SMS paging is similar to conventional paging services, but much more comprehensive, allowing bidirectional messages, store-and-forward delivery, and acknowledgment of successful delivery. The message preferably includes (at least) both the type and quantity of information awaiting delivery to the identified client station. By way of example only, an SMS paging message from the server 22 may contain a first field for identifying the type of information (e.g., "e-mail") and a second field indicating the quantity (e.g., "56 Mbytes") waiting for a specified client station 30.

Preferably, the paging message transmits the information type and quantity fields in both numeric form, so that the message can be interpreted both directly by the client station 30, and alpha form, so that the message may be interpreted by a user of the client station 30. In particular, if the client station 30 is not connected to its transceiver 32, receipt of an message transmitted from the server 22 is preferably still detected by a user of the client station 30, e.g., by an audible ring or mechanical vibration of the client station transceiver 32. The user could then either connect the transceiver 32 to the client station 30 so that the later may receive and analyze the message, or, alternately, the message may be viewed by the user on a display screen 33 provided with the transceiver 32, wherein the user can then decide whether to establish a communication link between the client station 30 and the server 22.

Figure 2:
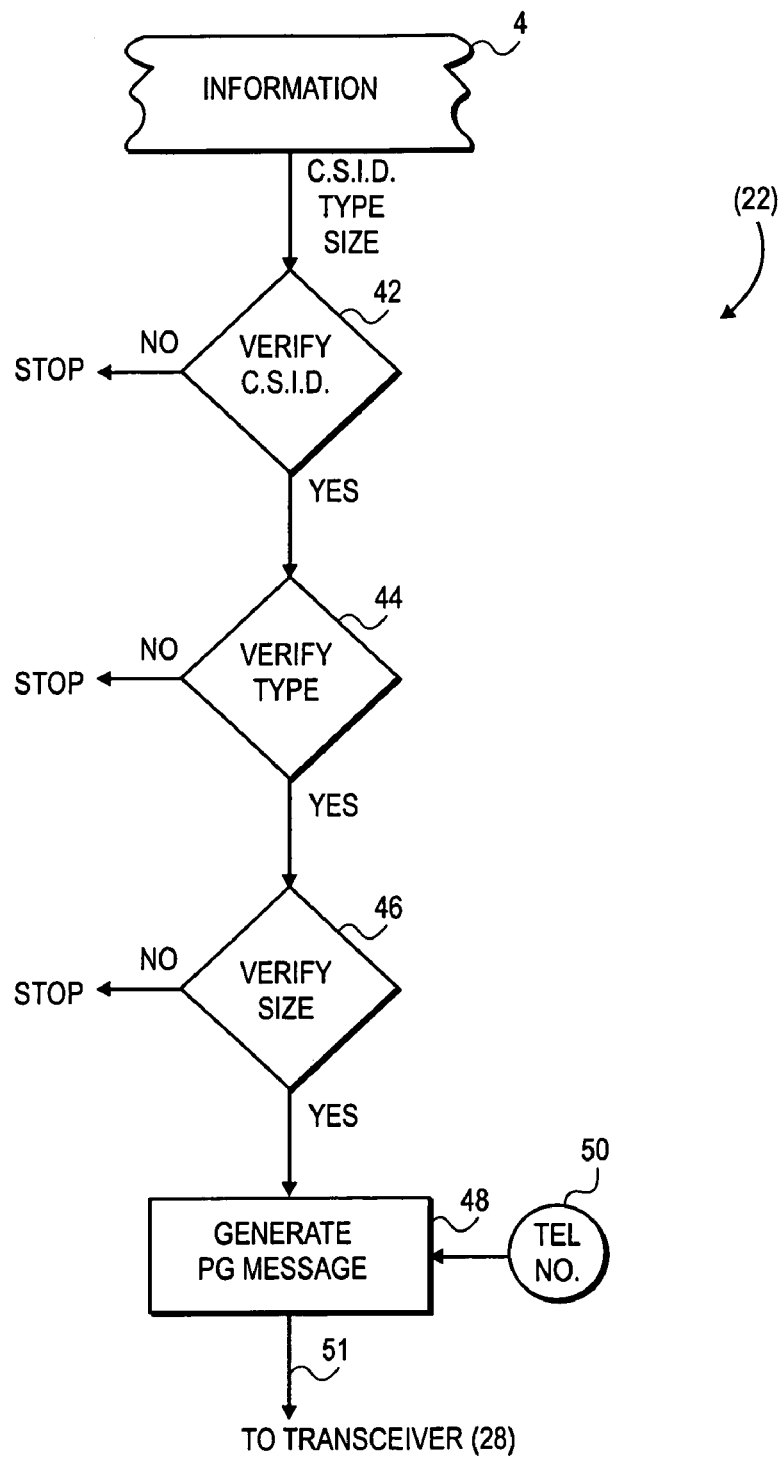
FIG. 2 is a flow chart depicting a preferred protocol at the server for the transmission of information to and from a selected client station.
Figure 3:
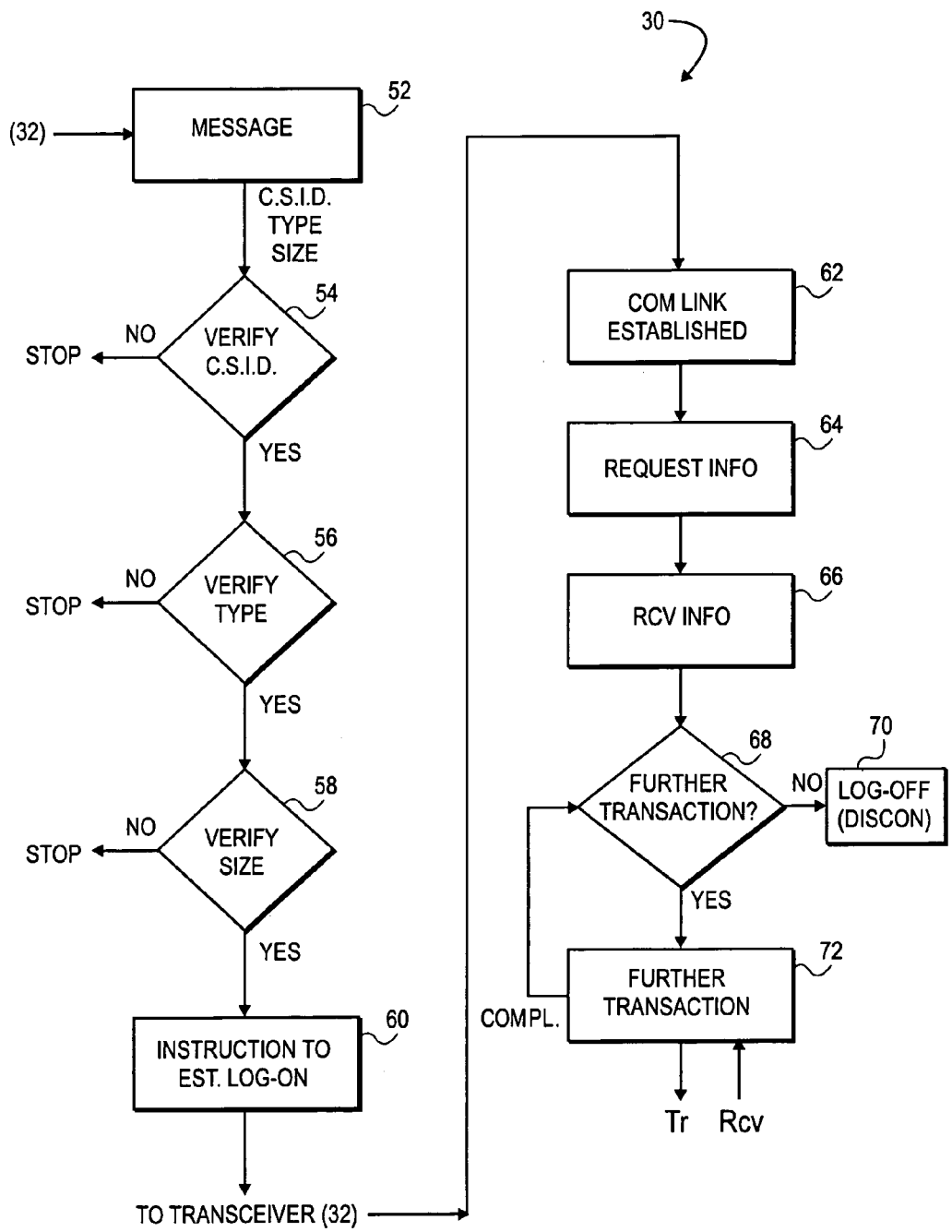
FIG. 3 is a flow chart depicting a preferred protocol at the client station for the transmission of information from and to the server.

A more detailed description of a preferred communication protocol for the transmission of information between the server 22 and a specified client station 30 is provided in conjunction with the flow charts set forth in FIGS. 2 and 3. Referring to FIG. 2, when an exemplary block of information 40 intended for a given client station 30 is first received, or otherwise generated, by the server 22, the server 22 performs a first look-up 42 to verify that the respective client station 30 has been selected to be notified of pending information, e.g., by comparing a client station address ("CSID.") associated with the information 40 against those stored in a respective memory table (not shown). The server 22 then performs a second look-up 44 to verify that the type (i.e., nature) of the pending information 40 is of a selected type that the respective client station 30 is to be notified of. Finally, the server 22 performs a third look-up 46 to verify that the size (or quantity) of the pending information 40 (i.e., byte size) is sufficient to justify notification of the respective client station 30. If any of these respective verifications 42, 44 or 46 fail, the server 22 takes no further action, but preferably saves the information 40 in a memory space (not shown) associated with the respective client station 30.

If all of the verifications 42, 44 and 46 are "yes," the server 22 generates a message 48 to send to the respective client station 30, which preferably includes (at least) the CSID of the information, along with the type and size. A stored telephone number 50 of the transceiver 32 associated with the respective client station 30 is appended to the message to form a paging signal 51, which is then sent to the server transceiver 28. The server transceiver 28 will then send an SMS page (not shown in FIG. 2) to the respective client station 30, based on the respective telephone number 50.

Notably, any or all of the respective CSID, type, and quantity verifications 42, 44 and 46 may preferably be by-passed (i.e., "turned off"), e.g., by a system operator or administrator. Further, as will be appreciated by those skilled in the art, the particular order of the respective CSID, type, and quantity verifications 42, 44 and 46 is not significant, i.e., any order may be employed. Still further, other types or combinations of filtering verifications may be employed in alternate embodiments.

In particular, the intelligent filtering of outgoing messages is preferably extensible, wherein various desired filtering options may be configured and applied (e.g., including particular thresholds for each filter) on a client station by client station basis. Thus, the aforedescribed filtering verifications illustrated in FIG. 2 are provided for purposes of non-limiting illustration of the inventive concepts described herein.

Moreover, in a presently preferred embodiment, the server 22 may be configured on a client station-by-client station basis, such that an SMS page is only made to selected client stations, and only then if certain types and/or quantities of information is waiting to be transferred.

Referring to FIG. 3, when a respective SMS paging message 52 is received by a client station 30 from its associated transceiver 32, it performs a similar set of filtering verifications on the received message 52. In particular, the CSID of the received message 52 is verified 54, to ensure the proper client station (30) has been sent the paging message 52. The respective client station 30 verifies that the identified pending information (40) waiting for it at the server is of a selected type 56 and quantity 58 that justify the cost of establishing a wireless communication link in order to immediately retrieve the information (40). If any of these respective verifications 54, 56 or 58 fail, the client station 30 takes no further action with respect to the received message 52.

If, however, all of the verifications 54, 56 and 58 are "yes," the client station 30 issues an instruction 60 to its associated transceiver 32 to establish a communication link with the server transceiver 28, whereby the client station 30 thereafter "logs-in" with the server 22.

Once a log-on/communication link 62 is established between the respective client station 30 and server 22, the client station 30 transmits a request 64 to the server 22 for the pending information (40). After receiving the pending information 66, the client station 30 may then utilize the now-established communication link 62 for conducting further exchanges of information with the server 22. From a flow protocol point of view, the client station 30 first polls 68 its resident applications to inquire whether further information exchange transactions 72 with the server 22 are desired. If none are desired, then the client station 30 logs-off 70 from the server 22 and the communication link is discontinued. If there are one or more desired further transactions 72, each is carried out, wherein the same inquiry 68 is made of the resident applications after each respective transaction 72 is completed, until there are no further desired transactions and the log-off/disconnect 70 is performed.

As at the server end, any or all of the respective CSID, type, and quantity verifications 54, 56 and 58 of received messages at the client station 30 may preferably be by-passed (i.e., "turned off") by a client station user (or remotely by a system operator or administrator). Further, as will be appreciated by those skilled in the art, the particular order of the respective CSID, type, and quantity verifications 54, 56 and 58 is not significant, i.e., any order may be employed. Still further, other types or combinations of filtering verifications may be employed in alternate embodiments.

In particular, the intelligent filtering of received messages is preferably extensible, wherein various desired filtering options may be configured and applied on a client station by client station basis, wherein the particular thresholds for each filter are preferably set by the respective client station users. Thus, the aforedescribed filtering verifications of received messages illustrated in FIG. 3 are provided for purposes of non-limiting illustration of the inventive concepts described herein.

While embodiments and applications of this invention have been shown and described, as would be apparent to those skilled in the art, many more modifications and applications are possible without departing from the inventive concepts herein.

For example, many types of communication networks other than a wireless network may be employed for providing connectivity between the client station and server following the paging notification of the client station by the server seeking to transmit information. By way of illustration, in an alternate preferred embodiment, upon receiving a paging notification from the server and determining that the pending information is of a sufficient type and quantity to justify the costs of establishing a connection to transfer the information, the client station may execute a dial-up connection over a local telephone network in order to reach the server.

In particular, the advantages of the present invention may be gained in a variety of client-server network architectures, including those spanning conventional (i.e., wired or optical) networks, wherever the continuous or polled connection between server and client station is impossible or otherwise impractical, e.g., where transmission set-up costs are a factor in deciding whether a transfer of information should occur between a server and a respective client station.

Thus, the scope of the disclosed inventions is not to be restricted except in the spirit of the appending claims.

What is claimed is:

1. A method of transmitting information from a server to a client station in a mobile-based client-server system, the method comprising:

determining that the server has information to be transmitted to the client station without the client station initiating the determination, the client station being a separate but connectable component relative to a transceiver, wherein the client station is initially disconnected from the transceiver;

transmitting a paging notification message from the server to the transceiver via a page link between the server and the transceiver, in order to provide notification that the server has information to be transmitted to the client station;

receiving the paging notification message at the transceiver; and based upon receiving the paging notification message, subsequently connecting the transceiver to the client station to establish a wireless communication link with the server to transmit a message from the client station to the server indicating that the client station is ready to receive the information, and in response, transmitting the information to the client station.

2. The method of claim 1, wherein the communication link between the client station and the server is established via the transceiver.

3. The method of claim 1, wherein establishing the communication link comprises:

generating a signal containing a telephonic address of a transceiver associated with the server, wherein the signal includes instructions for establishing a log-on connection with the server; and transmitting the signal to the transceiver associated with the server to establish a communication link with the server based on the telephonic address.

4. The method of claim 1 further comprising:

transmitting a first request for the information to the server via the communication link;

receiving the information; and transmitting an additional signal to the server via the communication link.

5. The method of claim 4, wherein transmitting an additional signal comprises transmitting a further request for information.

6. The method of claim 1, wherein the paging notification message indicates the type of information waiting for the client station at the server.

7. The method of claim 6 further comprising evaluating the paging notification message to determine whether the information is of a selected type.

8. The method of claim 7, wherein the paging notification message is evaluated at the transceiver.

9. The method of claim 7, wherein the paging notification message is evaluated at the client station.

10. The method of claim 7, wherein the communication link is only established when the information is of the selected type.

11. The method of claim 7 further comprising relaying the paging notification message from the transceiver to the client station.

12. The method of claim 7 further comprising connecting the client station to the transceiver.

13. The method of claim 12 further comprising downloading the paging notification message from the transceiver to the client station.

14. The method of claim 1, wherein the paging notification message indicates a quantity of the information waiting for the client station at the server.

15. The method of claim 14 further comprising evaluating the paging notification message to determine whether the information is of a selected quantity.

16. The method of claim 15, wherein the paging notification message is evaluated at the transceiver.

17. The method of claim 15, wherein the paging notification message is evaluated at the client station.

18. The method of claim 15, wherein the communication link is only established when the information is of the selected quantity.

19. The method of claim 15 further comprising relaying the paging notification message from the transceiver to the client station.

20. The method of claim 15 further comprising connecting the client station to the transceiver.

21. The method of claim 20 further comprising downloading the paging notification message from the transceiver to the client station.

22. The method of claim 1, wherein the transceiver is a GSM-based transceiver.

23. The method of claim 22, wherein the paging notification message is in an SMS paging message format.

24. The method of claim 1 further comprising evaluating the information at the server to determine whether the information is of a selected type, wherein the paging notification message is only generated when the information is of the selected type.

25. The method of claim 1 further comprising evaluating the information at the server to determine whether the information is of a selected quantity, wherein the paging notification message is only generated when the information is of the selected quantity.

26. A computer program product that includes a computer readable medium, the computer readable medium having stored thereon a sequence of instructions which, when executed by a processor, causes the processor to execute a process for transmitting information from a server to a client station in a mobile-based client-server system, the process comprising:
determining that the server has information to be transmitted to the client station without the client station initiating the determination, the client station being a separate but connectable component relative to a transceiver, wherein the client station is initially disconnected from the transceiver;
transmitting a paging notification message from the server to the transceiver via a page link between the server and the transceiver, in order to provide notification that the server has information to be transmitted to the client station;
receiving the paging notification message at the transceiver; and
based upon receiving the paging notification message, subsequently connecting the transceiver to the client station to establish a wireless communication link with the server to transmit a message from the client station to the server indicating that the client station is ready to receive the information, and in response, transmitting the information to the client station.

27. The computer program product of claim 26, wherein the communication link between the client station and the server is established via the transceiver.

28. The computer program product of claim 26, wherein establishing a communication link comprises:
generating a signal containing a telephonic address of a transceiver associated with the server, wherein the signal includes instructions for establishing a log-on connection with the server; and
transmitting the signal to the transceiver associated with the server to establish a communication link with the server based on the telephonic address.

29. The computer program product of claim 26, wherein the process further comprises:
transmitting a first request for the information to the server via the communication link;
receiving the information; and
transmitting an additional signal to the server via the communication link.

30. The computer program product of claim 29, wherein transmitting an additional signal comprises transmitting a further request for information.

31. The computer program product of claim 26, wherein the paging notification message indicates a type of the information waiting for the client station at the server.

32. The computer program product of claim 31, wherein the process further comprises evaluating the paging notification message to determine whether the information is of a selected type.

33. The computer program product of claim 32, wherein the paging notification message is evaluated at the transceiver.

34. The computer program product of claim 32, wherein the paging notification message is evaluated at the client station.

35. The computer program product of claim 32, wherein the communication link is only established when the information is of the selected type.

36. The computer program product of claim 32, wherein the process further comprises relaying the paging notification message from the transceiver to the client station.

37. The computer program product of claim 32, wherein the process further comprises connecting the client station to the transceiver.

38. The computer program product of claim 37, wherein the process further comprises downloading the paging notification message from the transceiver to the client station.

39. The computer program product of claim 26, wherein the paging notification message indicates a quantity of the information waiting for the client station at the server.

40. The computer program product of claim 39, wherein the process further comprises evaluating the paging notification message to determine whether the information is of a selected quantity.

41. The computer program product of claim 40, wherein the paging notification message is evaluated at the transceiver.

42. The computer program product of claim 40, wherein the paging notification message is evaluated at the client station.

43. The computer program product of claim 40, wherein the communication link is only established when the information is of the selected quantity.

44. The computer program product of claim 40, wherein the process further comprises relaying the paging notification message from the transceiver to the client station.

45. The computer program product of claim 40, wherein the process further comprises connecting the client station to the transceiver.

46. The computer program product of claim 45, wherein the process further comprises downloading the paging notification message from the transceiver to the client station.

47. The computer program product of claim 26, wherein the transceiver is a GSM-based transceiver.

48. The computer program product of claim 47, wherein the paging notification message is in an SMS paging message format.

49. The computer program product of claim 26, wherein the process further comprises evaluating the information at the server to determine whether the information is of a selected type, wherein the paging notification message is only generated when the information is of the selected type.

50. The computer program product of claim 26, wherein the process further comprises evaluating the information at the server to determine whether the information is of a selected quantity, wherein the paging notification message is only generated when the information is of the selected quantity.

* * * * *